US012689777B2

(12) United States Patent
Lykes et al.

(10) Patent No.: US 12,689,777 B2
(45) Date of Patent: Jul. 21, 2026

(54) PARITY AD DECISIONING FOR LINEAR AND DIGITAL PROGRAMMING STREAMS

(71) Applicant: Viamedia, Inc., Lexington, KY (US)

(72) Inventors: Randy Lykes, Lexington, KY (US);
Wendell Decker, Lexington, KY (US);
Adam Lynch, Lexington, KY (US);
James O'Neill, Bedford, KY (US);
Paul Cavins, Newburg, IN (US)

(73) Assignee: Viamedia, Inc., Lexington, KY (US)

( * ) Notice: Subject to any disclaimer, the term of this patent is extended or adjusted under 35 U.S.C. 154(b) by 96 days.

(21) Appl. No.: 18/674,731

(22) Filed: May 24, 2024

(65) Prior Publication Data

US 2025/0365456 A1     Nov. 27, 2025

(51) Int. Cl.
*H04N 21/234* (2011.01)
*H04N 21/81* (2011.01)
*H04N 21/845* (2011.01)

(52) U.S. Cl.
CPC ..... *H04N 21/23424* (2013.01); *H04N 21/812* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 10,779,020 B1 * | 9/2020 | Demsey | G06Q 30/0275 |
| 2003/0070167 A1 * | 4/2003 | Holtz | H04N 21/812 |
| | | | 705/14.69 |
| 2004/0193488 A1 * | 9/2004 | Khoo | G06Q 30/0272 |
| | | | 348/E7.071 |
| 2012/0030705 A1 * | 2/2012 | Flickinger | H04N 21/812 |
| | | | 725/35 |
| 2013/0219427 A1 * | 8/2013 | Zundel | H04N 21/23424 |
| | | | 725/32 |
| 2018/0255331 A1 * | 9/2018 | McLean | H04N 21/26258 |
| 2020/0204847 A1 * | 6/2020 | Lykes | H04N 21/8455 |
| 2020/0374599 A1 * | 11/2020 | Lykes | H04N 21/2541 |
| 2021/0058673 A1 * | 2/2021 | Loheide | H04N 21/4532 |
| 2022/0004358 A1 * | 1/2022 | Facey | A63F 13/77 |

* cited by examiner

Primary Examiner — Alexander Q Huerta
(74) Attorney, Agent, or Firm — Dergosits & Noah LLP

(57) ABSTRACT

An ad decision service ("ADS") serves advertisements to digital platforms in parity with linear programming schedules. The advertisements are prepared ahead of time by the ADS based on the linear programming schedules that indicate ad space availability. Upon receiving ad requests from a digital delivery platform, the ADS returns digital-compliant ad responses. Thus, the ADS provides the same ads that are chosen for delivery to linear platforms to the digital platforms.

6 Claims, 8 Drawing Sheets

PARITY AD DECISIONING FOR LINEAR AND DIGITAL PROGRAMMING STREAMS

TECHNICAL FIELD

This disclosure relates in general to advertising for use with video content programming, and more particularly, to providing the same advertising content for scheduled video programming being played out on different media delivery platforms, e.g., on digital network programming streams and linear programming streams.

BACKGROUND

In many markets for media placement, customers have two distinct choices for receiving and playing video programming content-linear broadcasts or digital streaming media. Linear programming, such as a conventional television broadcast, is content that is transmitted by satellite or cable according to a time-based programming schedule, for example, by national networks such as CBS, NBC, ESPN, TNT, etc. Linear programming may be delivered to customers by regional and/or local distributors, generally known as Multichannel Video Programming Distributors (MVPDs) such as Comcast, Cox, DirectTV, etc. Linear programming may also be delivered to customers by network affiliates-regional or local broadcasters not owned by a network but carrying some or all of the network programming. Finally, streaming digital media is content that can be delivered either live or on-demand to a digital user device via a digital communication protocol, such as Internet Protocol Television (IPTV), by services such as Hulu, Netflix, Amazon Prime, etc.

However, this choice for content delivery also presents a dilemma for advertisers who must try to sell ad space in markets having both types of content delivery platforms-linear and digital-including different reporting and payment methods for the different platforms. This can confuse the customers and be a deterrent to both buyers and sellers of advertising.

There are relevant standards for identifying and responding to advertising opportunities in video programming streams, including those promulgated by the Society of Cable Telecommunications Engineers ("SCTE"), such as SCTE 35 entitled Digital Program Insertion Cueing Message for Cable, which defines a "cue message" for a programming stream for identifying ad avails in linear programming streams. In addition, the Interactive Advertising Bureau ("IAB") has a standard specification for communications between digital ad servers and digital video players called the Video Ad Serving Template ("VAST"). Digital content (including digital ads) served according to the VAST protocol can be played by any digital video player.

In order to avoid different needs for ad sales on digital and linear platforms, it would be desirable and advantageous for both buyers and sellers to have a single approach to ad sales regardless of the programming delivery platform.

DETAILED DESCRIPTION

This disclosure describes systems and methods for serving the same advertisements at the same time (more or less) for the same programming to digital devices as would be served on linear platforms. An ad decision service ("ADS") is configured to receive ad requests from ad routers or manifest servers of digital delivery platforms and to provide in return VAST-compliant ad responses. Advantageously, the ADS distinguishes between "parity" ad requests from linear platforms and ad requests from digital/OTT platforms and provides the same ads that are chosen for linear delivery to the digital platforms via a VAST-compliant ad response. The specific focus of this disclosure is satisfying the parity ad requests to enable delivery of the same ad to digital platforms.

Conventionally, an ad request from a digital/OTT platform typically requires a campaign management platform such as SpotHop that will reach out to supply-side ad providers (SSPs) and demand-side ad providers (DSPs) for selecting and delivering the desired ad spots. In contrast, however, parity ad requests from a linear platform use the programming schedules for planning and selecting an ad to be served into an ad avail. In this disclosure, the schedule information is used by the ADS system in the same way to build out VAST-compliant responses ahead of time that correspond to the selected ad for linear platforms and can be delivered upon request. This result enables the local ad seller to sell the same ad space in the same time slot whether the customer accesses the digital or the linear platform.

Figure 1A:
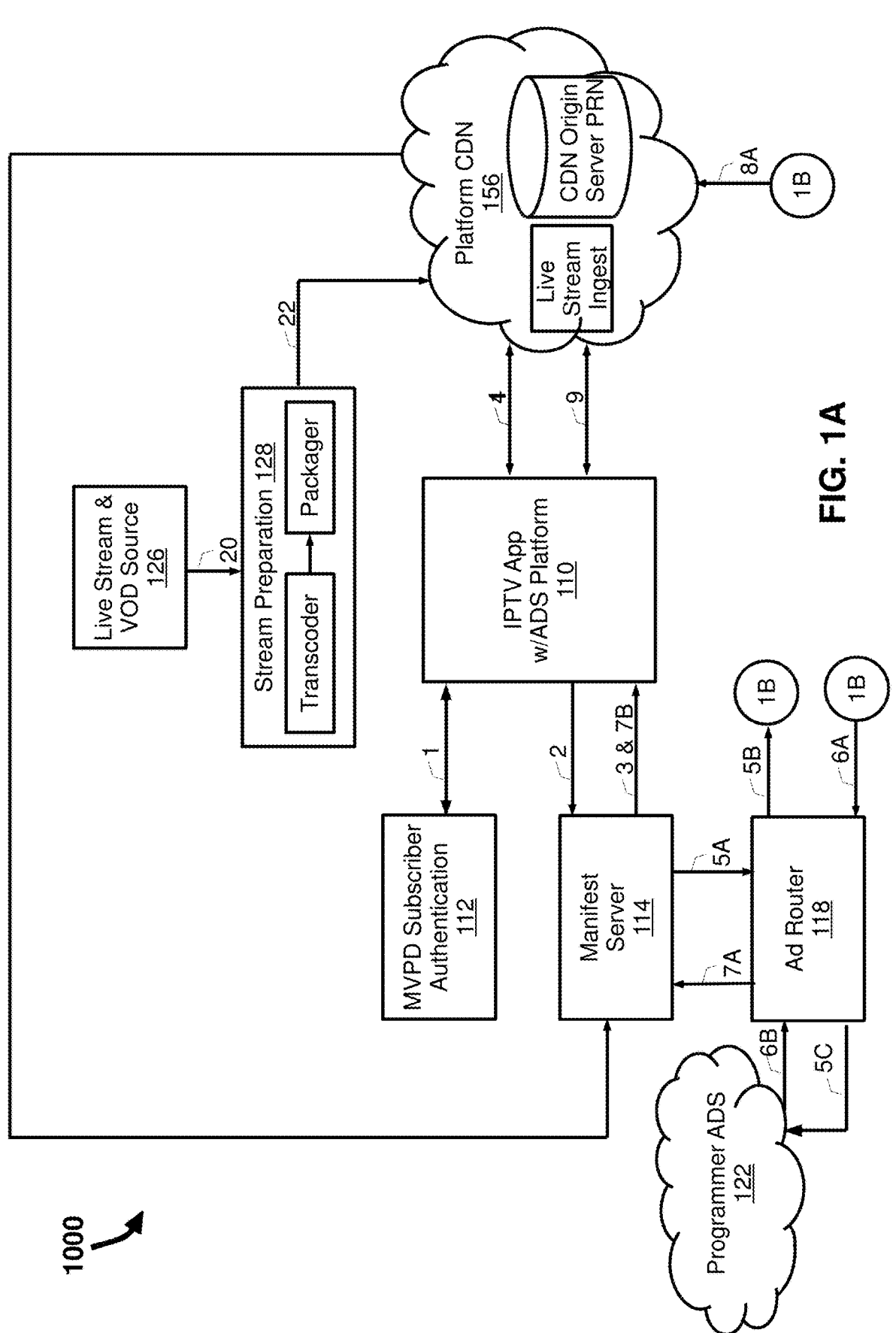
FIGS. 1A and 1B are block diagrams illustrating a workflow of a parity system for ad insertion.
Figure 1B:
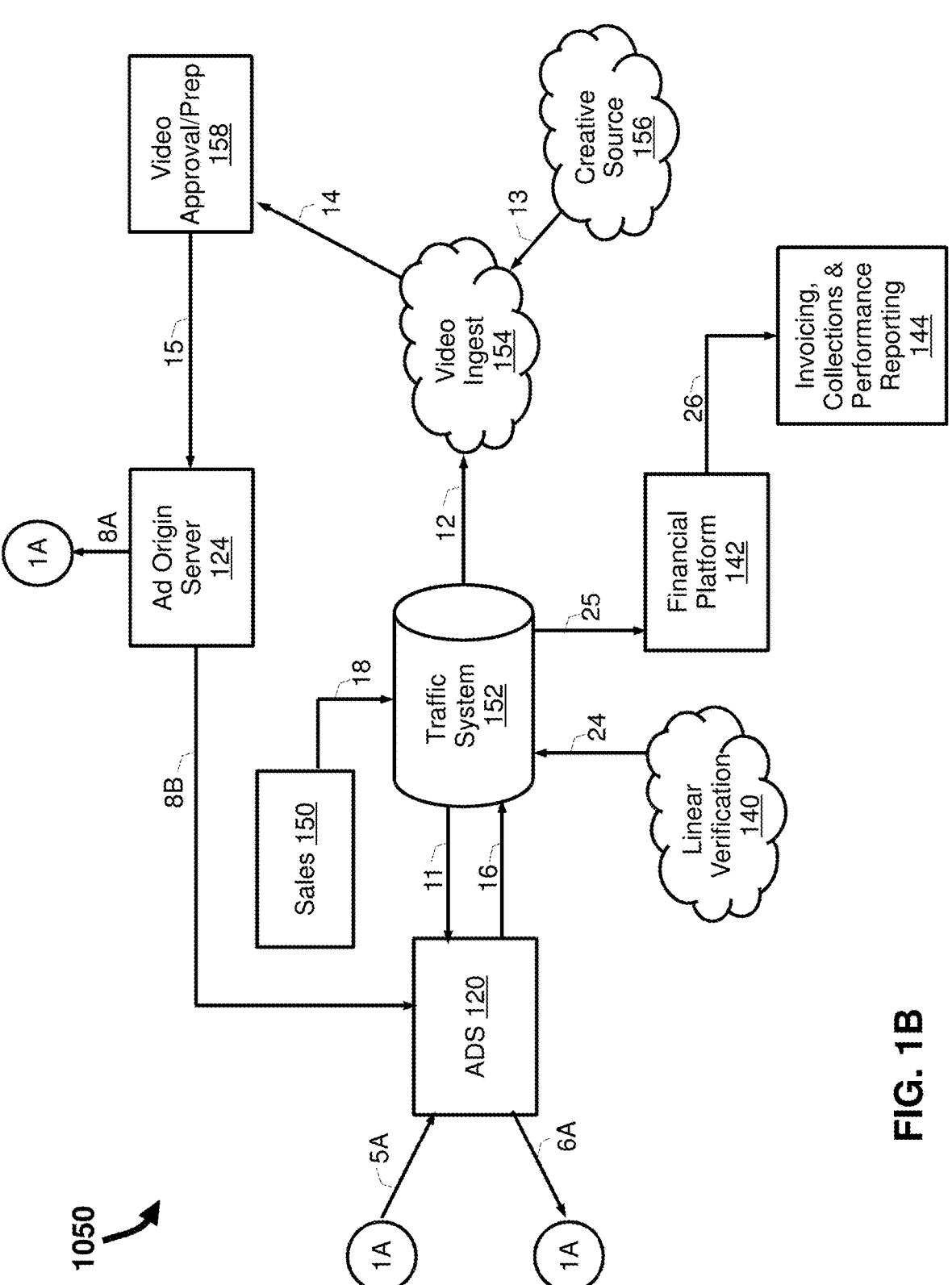

FIGS. 1A and 1B illustrates a workflow embodiment for a "parity" system 1000 capable of operating as a stand-alone system to provide ads to IPTV systems in parallel with a conventional linear programming distribution platform that distributes linear programming content in accord with the Commercial Advertisement Loudness Mitigation (CALM) Act. The parity system 1000 works together with a sales and traffic block 1050 to decide upon and deliver the same ad for insertion into the same content delivered via IPTV streams as is delivered via linear streams. An example of linear ad insertion is described in applicant's prior U.S. Pat. No. 10,757,462 entitled Integrating Digital Advertising Ecosystems into Linear TV.

Thus, system 1000 can be operated by distributor, such as an MVPD or network affiliate, and integrated with its service offerings so as to be essentially transparent to customers. In this manner, the distributor can sell a single ad package to customers seeking to place advertising within the distributor's area of operation for use on both linear and digital platforms, rather than having to sell one ad package to serve its linear programming customers based on actual playout for viewed content (for example, by data polling from user set top boxes), and another package to serve its digital programming customers based, for example, on cost-perthousand (CPM) impressions from each single digital user device that accessed the programming content.

In this example, the end user device 110 is an IPTV device; that is, a client media player having an over-the-top (OTT) media application installed and configured to receive streaming content over Internet Protocol networks, for example, a smart phone, or tablet, or smart TV. From device 110, the user gets authenticated through the MVPD subscription service at authentication module 112 and chooses live stream or on-demand content via path 1. Upon authentication, the programming manifest (also known simply as a manifest or playlist) is requested by the OTT app in user device 110 via path 2, obtained from the manifest server 114 and returned via path 3 to the user device. The live stream or on-demand content is delivered to the user device 110 from the content delivery network (CDN) 116 via path 4.

The programming manifest is created after the manifest server 114 receives a schedule file from a broadcast network content provider or any other type of content provider of third-party service. The programming manifest includes programming information extracted from the schedule file, including video content and marketing information. In another embodiment, the programming information may also include a set of business rules. Based on relevant information and the applicable business rules for the network or content provider, the programming manifest is created and stored on the ADS platform CDN 116. At the scheduled time for the programming content being streamed, the manifest is called and played out.

The programming manifest is created from a linear traffic platform and is based on Insertion Orders (IO), namely ad play requests, received from various linear demand sources. Most IOs are network, program, and time specific, and the programming information (network, program name, program time, local break formats, etc.) ingested into the traffic system is used, in conjunction with other business rules, to create the linear schedule.

The ad request will include data that helps the Parity ADS determine the associated location of the viewer in the programming schedule in order to associate the VAST Response with the linear ad that is scheduled to play. At the appropriate time, the VAST Response is delivered to the Manifest Server where it will be played out in the appropriate ad spot.

Part of the linear programming manifest includes triggers or ad markers, such as the SCTE 35 cue message. When this ad marker is recognized ahead of the event, the Manifest Server knows to make a VAST call. There are many different types of ad markers that can cause the Manifest Server to do different things, i.e., a local break can be discerned from a national break and each can be directed to a different ADS for decisioning.

As the manifest server 114 delivers the manifest to the user device 110, it also triggers an ad request, which is sent via path 5A to the ad router 118. The ad router 118 forwards the ad request either to an independent ad decision service (ADS) 120 via path 5B, or to an independent programmer ADS 122 via path 5C. Different markers are inherent in the programming stream to identify the appropriate path, and the encoders can pass these markers on to the CDN 116 and subsequently to the manifest server 114. The ADS 120 (or ADS 122) determines which ad to play based the information it receives from a Traffic schedule file, derived from the programming schedules published ahead of time by the networks, and the parameters/information included in the Insertion Order. The decision on ad selection could be made using a local instance of Google Ad Manager, but this decision unit could also be implemented using technology from Cadent, Freewheel, and other decision platforms.

As an initial matter, each programming network creates and publishes a unique programming schedule for each day for each of its channels (if more than one), identifying the time slots and programming content, as well as identifying the structure and format for local ad insertion availabilities. A number of third-party vendors provide a service for consolidating and standardizing the various network programming schedules into a comprehensive data file having a standard format and still commonly referred to as a CCMS schedule file after the company that first standardized this information, Cable Computerized Management Systems, Inc. For a fee, local stations or MVPDs can import the comprehensive programming schedule file from a third-party vendor into their local traffic and billing system 1050. This enables creation of a local ad insertion schedule file for scheduling and selling local ad placements by the distributor and for billing its customers for airings of ad copy. The scheduling information includes the approximate timing for local ads to be delivered and inserted by specifying an ad window at a fixed time and an ad break at an approximate time within the ad window.

For example, a typical local ad insertion schedule file has an eight-character filename such as "MDDCCHHH.SCH" where M represents month (with a hexadecimal range 1-C); DD represents day of the month (with a decimal range 01-31); CC identifies the channel (with a decimal range 01-99); and HHH identifies the MVPD headend (with a decimal range 001-099). The typical schedule file has the file extension "SCH" and the multiple data records contained within the file describe twenty-four hours of programming information, typically midnight to midnight. There is also a standard verification file (not shown) with the same filename and the file extension "VER" that contains corresponding data records for ads that actually aired. The data records in the schedule and verification files each include a number of data fields that are populated with relevant information about the broadcast event, such as the type of broadcast, scheduled date of broadcast, scheduled time of broadcast, program name, etc. One data record corresponds to one broadcast event.

Upon receiving an ad request, the ADS 120 (or 122) creates or retrieves a VAST response that is delivered back to the ad router 118 via path 6A (from ADS 120) or path 6B (from ADS 122). The VAST response is created, and may be created ahead of time, based on the information provided from the linear schedule file (MVPD, zone name, ad ID) and data needed for confirming ad status (ad play/ad fail) on the return handshake.

The VAST response is returned to the manifest server 114 from the ad router 118 via path 7A and stitched into the program manifest created for user device 110. The modified manifest is delivered back to the user device 110 via path 7B, and at the appropriate time during content delivery in accord with the modified manifest, the selected ad will be called and played back on the user device.

An ad origin server 124 (either acting as the platform origin server or sending content to the platform origin server) facilitates the content distribution process by delivering the streaming content including the selected ad to the platform CDN 116 via path 8A and sending the URL information to ADS 120 via path 8B.

The program content (live stream or video-on-demand) originates at a content source 126 and is sent via path 20 to a stream preparation module 128, where the content is transcoded and packaged accordingly for delivery. For example, a linear live stream will have an embedded tag or marker, such as an SCTE 35 cue message, that is used as a trigger for indicating and initiating action on the ad avail, while digital streams, such as video-on-demand, likewise require preparing a tag or marker of some kind, such as a VAST tag or a VMAP tag, for indicating the ad avail. The live stream or on demand content is then delivered to the platform CDN 116 via path 22.

Initially, ad sales are made to customers and logged at module 120 and the orders ingested into the traffic system 152 via path 18. The traffic system 152 is typically software-implemented, such as the Novar traffic and billing software distributed by Imagine Communications. The traffic system 150 also receives CCMS standard programming schedule files from a vendor, produces its own local (or regional) corresponding schedule files including ad insertion points, and provides the local schedule to the ADS 120 via path 11.

The traffic system 150 also provides a list of creatives (e.g., images, videos, audio and other formats) via path 12 to a video ingestion platform 154, and sources for the creatives, such as creative source 156, provide the listed creatives to the video ingestion platform, e.g., via path 13. The video ingestion platform 154 delivers the creatives to module 158 via path 14, where ads are prepared and approved by the customer and then delivered to the origin server 124 via path 15.

As previously described, the origin server 124 provides the ad content to the platform CDN 116 via path 8A and the URL of the ad content to the ADS 120 via path 8B. At the appropriate time in accord with the modified manifest, the ad is delivered from the CDN platform 116 to the IPTV user device 110 via path 9. The ADS 120 generates verification data for ad delivery upon receipt from the manifest server 114 of an indication that the manifest was modified, and the verification data is sent via path 16 to the traffic system 152 for reporting and invoicing. The traffic system 152 receives linear and parity playout verification from module 140 via path 24, and sends all the data regarding playout to financial platform 142 via path 25. The financial platform 142 sends the data to module 144 via path 26, where partners and customers are provided with performance reporting and invoicing, and revenue is collected and allocated accordingly.

Figure 2:
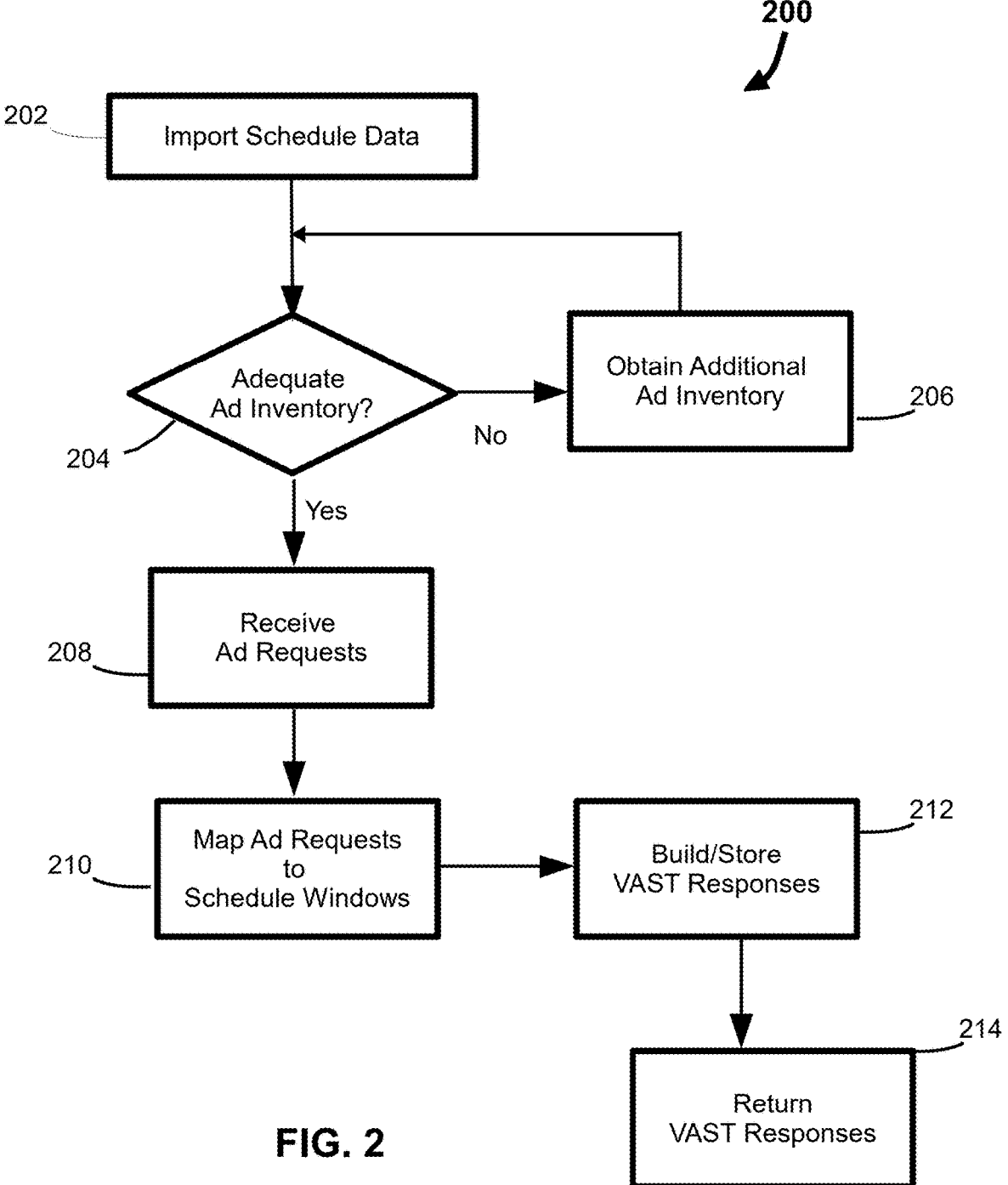
FIG. 2 is a flowchart illustrating an embodiment of a system for inserting ad content into a digital programming stream.

Referring now to FIG. 2, a simple process 200 is illustrated for implementing parity ADS. In step 202, programming schedule data is imported into the ADS, for example, as a standard CCMS schedule file described above. In particular, the schedule data describes the approximate timing for ads to be delivered to programming content for a particular network. Each network creates unique schedules for each day. For example, the CCMS schedule file can include at least one data record having a plurality of data fields for providing information about the broadcast programs for all networks including a plurality of ad insertion parameters. The insertion parameters include, for example, a start time and duration of an ad window, and can include other information useful for ad selection and targeting.

The ADS then creates its own local schedule from the CCMS schedule in step 203, and identifies the available ad spots for local ad insertion. In step 204, the local schedule is analyzed by the ADS to ensure there is an acceptable inventory of available ads to fill the various types of ad avails, such as paid spots, fill spots, bonus spots, etc. For example, an inventory of available ads may be accessed. The inventory may include what ads are available for which network and for what time slot. Using the inventory and schedule data, a decision can be made as to which advertisements are available and acceptable to fill the ad slots to provide advertisements. In the event that there are not enough available and acceptable ads to fill the various types of ad avails, then in step 206, additional inventory may be located and accessed or obtained for use as necessary.

If adequate ad inventory exists in step 204, then in step 208, multiple ad requests are received into the ADS from the ad server/manifest server. For example, the server may include programming features that are useful in constructing an ad request, in particular, by providing data to be used in a configurable data field in a VAST request to pass ad parameters and other important information. Programmable fields in the VAST request may include (i) specification of ad rules, i.e., whether to follow the VAST workflow or a different ad rules workflow; (ii) identifying the content source (like video on demand "VOD"); (iii) listing the specific video identifier (such as a specific VOD asset; for example, someone wants to advertise on all John Wayne movies); (iv) including key-values (such as: daypart ads, DMA, zip code, genre, age, gender, income, etc.); (v) identifying fall-back ad data—if the primary ad is not available, the ADS can send multiple responses based on priority); and (vi) providing instructions to handle any issues that arise under the Children's Online Privacy Protection Act of 1998 ("COPPA"); to name just a few.

Each ad request is then mapped in step 210 to a corresponding ad window in the local schedule, also known as the programming manifest or playlist. For example, all ad requests sent to the ADS are tracked using the start point of the schedule window as the anchor and are filled sequentially. Thus, the first ad request would get mapped to the first break in the schedule window; the second ad request would be mapped to the second break in the schedule window, and so on. There may be a predefined black-out duration between the ad requests in the schedule window in order for the application to understand the difference between the different ad requests.

In one embodiment, the ADS application does not skip breaks in the schedule window; i.e., each sequential request from an individual device gets mapped to the next break in the schedule window. Further, a business rule could be captured in the ADS to provide responses for only certain types of ad avails, such as fill and bonus spot types, in which case the ADS application will only revert for breaks that have fill and bonus positions in them.

In step 212, the responses are built by the ADS and stored until delivered at the appropriate time back to the manifest server in step 214, e.g., a VAST response to a VAST request. The VAST response identifies the ads for each mapped-out schedule window based on the ad insertion parameters included in the VAST request.

In another embodiment, if the video playout is paused and resumed after some period of time, the ADS may or may not be configured to track back to the original ad request. If not, the application can serve the break either based on the current schedule window and break in progress or as scheduled in the modified manifest.

The ADS may receive a large number of ad requests per window and per break as multiple users log into their devices. In one embodiment, upon receipt of the first ad request, the ADS may be configured to map all ad requests received, for example, for the next five minutes to the same window/break. The next set of requests received after the first five minutes will be mapped to the next window/break, and so on.

Figure 3:
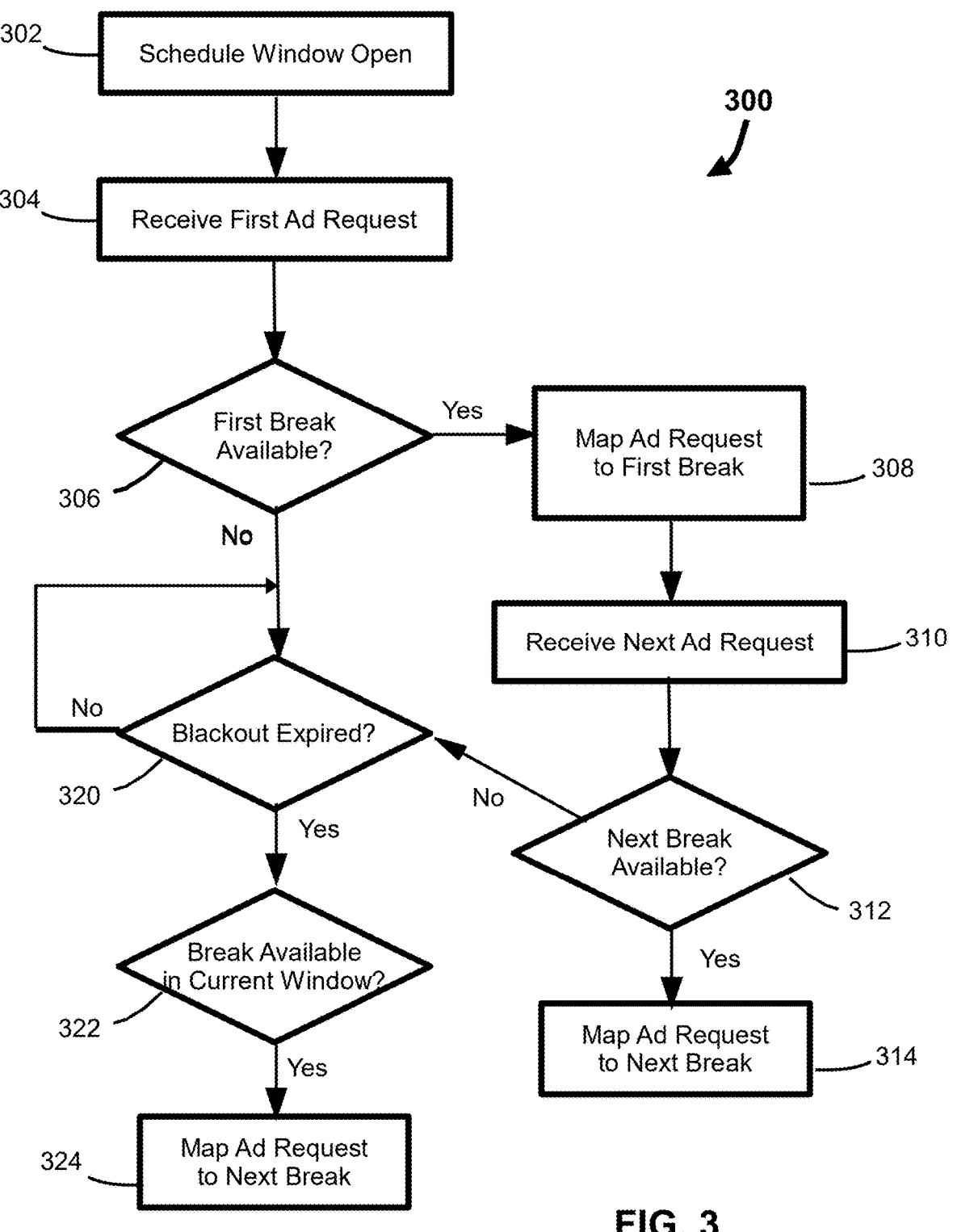
FIG. 3 is a flowchart illustrating an embodiment of a counter employed to count and manage the ad breaks in ad windows.

For the schedule windows handled by the Parity ADS, there should ideally be an ad request for each ad break. In one embodiment, a break counter is employed to manage the breaks, as illustrated in the process 300 shown in FIG. 3.

In step 302, a first schedule window opens, corresponding to the start of a broadcast of a first program. For example, a live stream or on-demand content is delivered to an end user device. The program in the live stream or the on-demand content includes triggers indicating a first schedule window opening. In response to the trigger, an ad request, such as VAST request as described below, is generated and sent to an ad router.

In another embodiment, the trigger is akin to a queue of scheduled programming data. The queue may include a set of scheduled programming and a set of ad insertion spots. When the beginning of an ad insertion spot is detected, a VAST request is automatically generated.

In step 304, the ADS receives the first ad request is from the ad router, which originates from the OTT application for multiple viewers. In step 306, the ADS determines whether the first break window is available. For example, the ADS determines if the ad break window in a live stream program is currently open. If the first break is available, then at step 308, then the ad request generated in step 302 is mapped in to the first break window.

In step 310, the ADS receives another ad request, and in step 312 the ADS again determines whether a second ad break window is open. If the second ad break has not yet arrived and is available in step 312, the second ad request gets serviced in step 314 and mapped to the second ad break for all current viewers. This process continues until there are no more ad break windows are available. Similar processing steps could be added for additional available ad breaks within the current schedule window.

If the first ad break is not available in step 306 or the second ad break is not available in step 312, a determination is made as to whether a blackout period has expired. That is, the playout for the first break is imminent or in process, then a configurable blackout period will extend at least for the duration of the break. If the blackout period has expired in step 320, then the question is whether there is another scheduled ad break within the current schedule window in step 322. If so, then the request can be mapped to the next break in step 324. If there is not another scheduled ad break within the current schedule window in step 322, then the application may be configured to carry over ad requests to map within breaks in the next schedule window, or alternatively or optionally, fail to provide an ad consistent with the schedule and instead simply provide an ad through default selection.

As discussed above, the ad requests could be VAST requests. With regard to the handling of VAST requests, there can be multiple requests for a break within a window, and for each request, there will be an appropriate response from the ADS for each request.

There may also be cases where user ad requests are delayed due to paused playout. In such a case, the ADS is configured with a response protocol. For example, if the delayed request is still received within the current schedule window and there is another scheduled ad break, the request and response may be mapped into the next ad break. If there is no mechanism configured to track the paused playout, then the application can by default revert to consider only breaks in the current schedule window even if different from the original schedule window.

As one example, consider a first user watching a program starting live at 0900 that has a schedule window of one hour, with three ad breaks scheduled, each one at 15-minute intervals from the start time. If the first user pauses the playout at 0910 before the first break scheduled at 0915, however, then no ad has yet played out for the first user. As time passes, however, the application remains running with respective breaks still getting played out during the scheduled program for other live viewers. Thus, if the first user resumes the playout at 0940, having already missed two scheduled breaks at 0915 and 0930, the first ad request for the first user will be played at 0945, which is actually the third break of the schedule window. In this case, the first application is configured to present the first user one of the ads from inventory available at the 0945 break and not any ads which were available at the 0915 break.

In the same example, if the first user continues playout at 1000, the program is supposed to be over, but the viewer is watching late due to the paused playout. The simplest configuration is to enable ads for the first user which may be available at 1000 and not ads that were available at 0930 or 0945.

In response to the VAST requests, a VAST response is generated, which describes which ads should be played. The selected ad may be identified by providing a link to the ad location, or by actually retrieving the ad from local storage on the video server or external resource. In one embodiment, the selected ad is identified and the VAST response is delivered to the video server. In another embodiment, the selected, pre-approved ad is retrieved by the video serving platform after receiving the VAST response that identifies the (out of local network) location of the selected ad. The ad is then retrieved, encoded, distributed and stored in the Media Serving Platform for playout upon next request. In other words, the VAST response identifies the location of the selected ad and the ADS maps the schedule window to the ad.

Continuing with the same example from above, if the first user resumes playout after the defined schedule window, then in one configuration, the ads from next schedule window may be mapped to the requests of the first user.

As the last example, if the first user chooses to go live after the paused playout, rather than continuing from the stop point, then in an embodiment, the ADS will continue to map the requests to breaks in the current schedule window.

Once an ad manager registers all successes and failure of ad insertion at the video server. Successful impressions are counted toward ad campaign fulfilment. The video server periodically creates a verification file for each of the active ad insertion networks, e.g., daily. The verification data are collected into the verification file.

Figure 4:
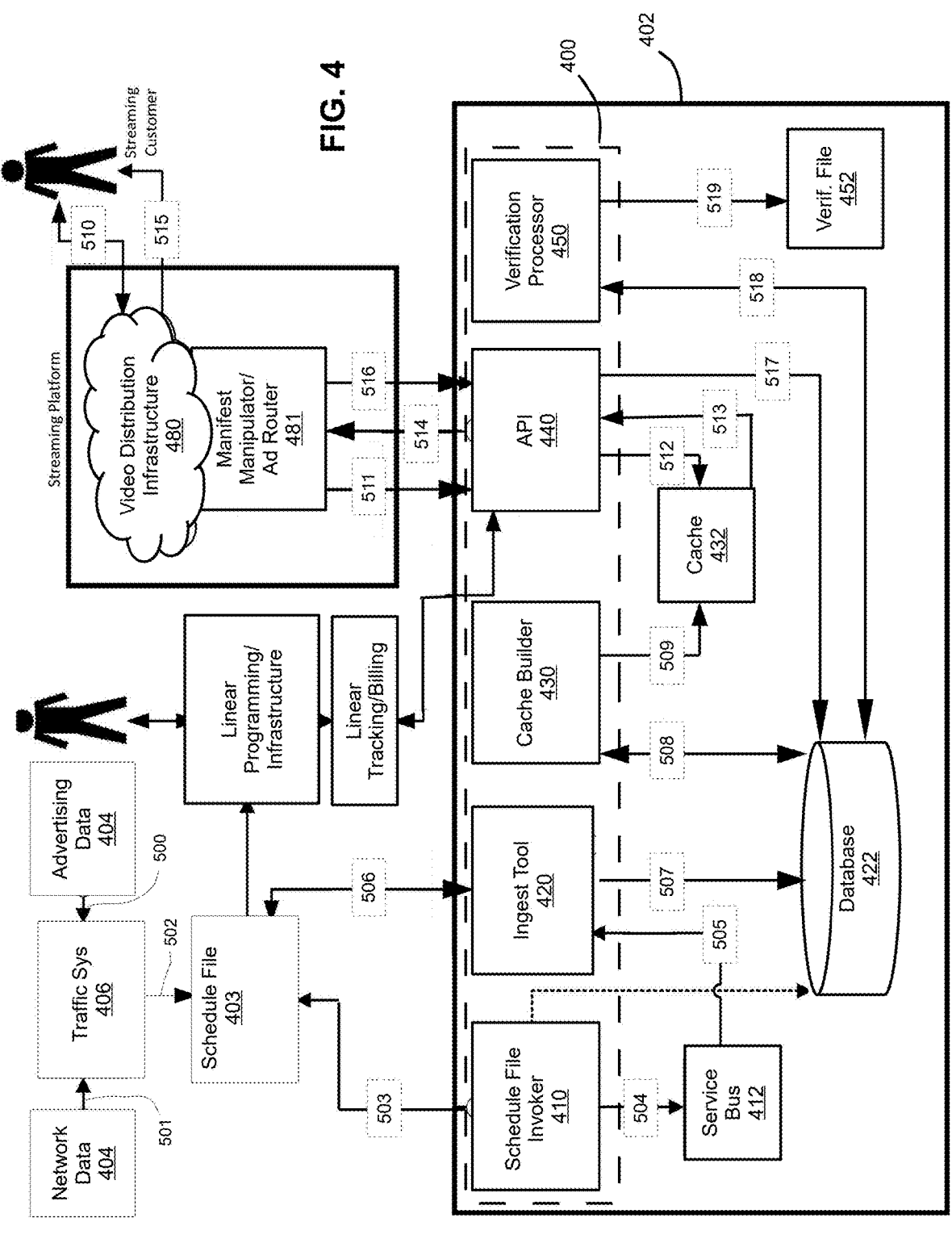
FIG. 4 is a block diagram illustrating the components and workflow for an embodiment of a parity ad decisioning system.

Referring now to FIG. 4, a simplified architectural scheme illustrates the basic components and workflow for a parity ADS embodiment 400. The parity ADS 400 will create and store VAST responses ahead of time for available ad spots based on linear scheduling information obtained from network broadcast entities regarding local advertising availabilities as well as various ad selection and scheduling criteria. When a local ad is called for during playout of the video programming content, whether on a digital platform or a linear platform, the ADS 400 can serve the same ad to the same ad availability on the digital platform that is scheduled on the linear platform.

The ADS 400 can be built using an enterprise-grade cloud file share platform 402, such as Microsoft's Azure. Azure shares can be mounted concurrently by cloud or on-premises deployments of Windows, Linux, and macOS, for example. Advantageously, Azure shares can also be cached on Windows Servers with Azure File Sync for fast access near where the data is being used.

On the front end, external to ADS 400, a third-party vendor receives a multiplicity of network schedule files that indicate the open avails for local ad insertion, i.e., a collection of programming schedules from the various network broadcast entities for future days programming including local avails, and creates and distributes to customers its own form of the schedule files 404. In particular, the schedule files 404 identify the local ad availabilities in the schedules and provide the program information and related advertising data. The schedule files 404 are provided dynamically every day by the third-party vendor to customers, e.g., ad sellers, for example along path 500 to the traffic system 406. Additional advertising demand information and targeting criteria is provided to the traffic system 406 by third party and/or in-house sources 405 along path 501.

The traffic system 406 identifies the holes in the programming schedules 404 that provide a limited number of ad avails that require selling and filling at the local level by the local distributor and/or its sales team. The traffic system 406 thus creates its own local form of the schedules for ADS 400 to use for building, storing, and then serving VAST responses in the available ad spots. The finalized local schedules are sent along data path 502 into storage, e.g., a shared schedule folder 407. For example, shared schedule folder 407 can be implemented using Azure File Shares or an internal file sharing network.

The ADS 400 includes a first module 410 called the Schedule File Invoker that monitors the schedule folder 407 via path 503 to detect when the current finalized local schedules for the next day and future days have been received from the traffic system 406. Upon such detection, the File Invoker module 410 communicates the schedule status to a second ADS module 420, the Ingest Tool, for example, by pushing a message onto the Azure Service Bus 412 along path 504. The Ingest Tool 420 monitors the Azure Service Bus 412 via path 505 to detect messages. Once it receives the message that the current local schedule files are available from the shared schedule folder 407, the Ingest Tool 420 downloads the local schedule files along path 506 and then populates the local schedule data into database 422 along path 507.

The ADS 400 includes a third module 430, the Cache Builder, which monitors the database 422 for new schedule files. The Cache Builder 430 retrieves the local schedule and all related schedule information via path 508 and builds an appropriate VAST response for each local ad avail—by network, or zone, or MVPD, etc. The VAST response including all information related to the schedule window, ad spot, etc., is then stored along path 509 into a cache 432, e.g., the Azure Redis Cache, for retrieval and serving at the appropriate time. At this point, all appropriate streaming ad response for future time periods are built and stored in advance for each ad avail that the local distributor has the opportunity to fill. Azure Cache for Redis provides an in-memory data store based on the Redis software, which improves the performance and scalability of an application that uses backend data stores heavily.

Here the flow jumps to wait for customer demand for streaming content from a video distribution infrastructure on platform 480. The customer device interacts with the streaming platform 480 along path 510 to communicate with the platform to select content and use other features of the platform. The video platform 480 includes a point-of-service router 481 for delivering ad (and video) content to the customer along path 515.

Upon the customer's selection and watching of video content, ad calls are made from the router 481 along path 511 to a fourth ADS module 440, an API service layer. Since the ad has already been created based on the local linear schedule file, the API 440 sends the ad spot opportunity information along path 512 to the Redis Cache 432, which has the appropriate VAST response for this spot ready to go in the proper format. The VAST response is returned to the API along path 513, which then passes the VAST response back to the ad router 481 along path 514, which, following the manifest manipulation process, is causing the appropriate ad to be played out to the customer device via path 515.

The API 440 also handles the tracking information, i.e., verification that the ad played. A tracking beacon comes back into the API 440 from ad router 481 along path 516, and is saved by the API into the database 422 along path 517.

Although this function could be incorporated external to ADS 400, a fifth module 450, the Verification Processor, handles the verification process-if the ad played, it will be billed. The Verification Processor 450 monitors the service bus 412 for a message that an ad has played out, and when received, obtains the information from the database 422, creates a verification file, tracks how many successful beacons it received and applies all of that the collected information to the data base 422 and sends the verification file to file storage 452 for use in billings as appropriate following the standard operating procedures of the sales entity. The verification files track successful play out, as well as the number of successful playouts per ad. The impression information (digital ad delivery data via the tracking beacon) can also be amalgamated with the linear "as run" data for comprehensive (e.g., linear+OTT) verification and performance reporting and associated billing.

Figure 5:
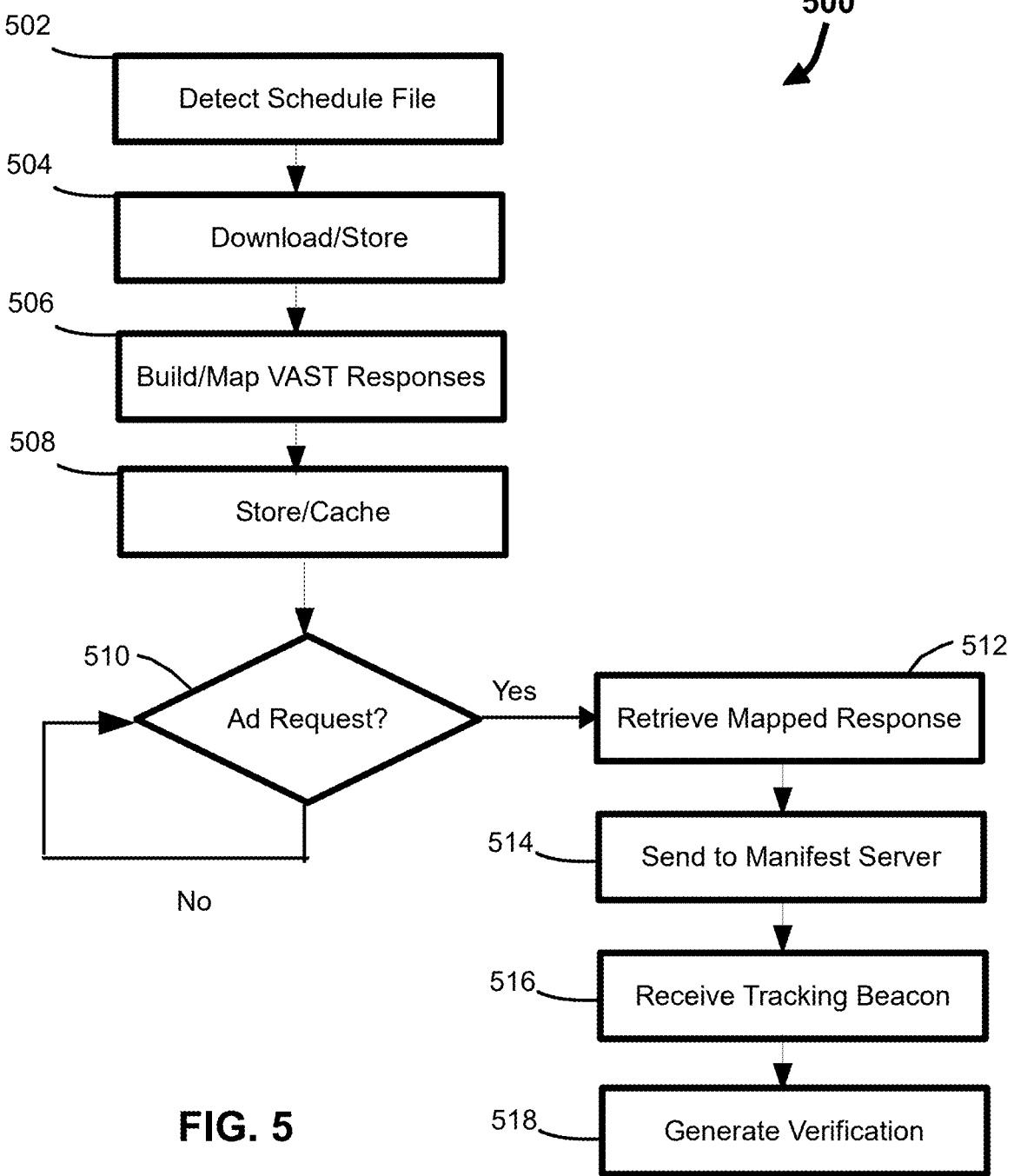
FIG. 5 is a flowchart illustrating a method of implementing a parity ad decisioning system.

Referring now to FIG. 5, a flow chart 500 illustrates the ADS method. In step 502, the ADS (e.g., the Invoker module) detects that a current local schedule file has been received in which the local ad avails are identified. The local schedule file is downloaded to the ADS (e.g., by the Ingest module) in step 504. The ADS (e.g., the Cache Builder module) then builds out in step 506 VAST responses, including a tracking beacon, and maps the responses to each of the local ad avails identified in the local schedule file. In step 508, the VAST responses are stored or cached. When an ad request for a local ad avail is received in the ADS (e.g., in the API) from a manifest server on the IPTV platform in step 510, the ADS (via the API) retrieves the VAST response that is mapped for that avail from storage in step 512, and sends the response to the manifest server for playout in step 514. When the ad has played out, the tracking beacon is returned by the manifest server to the API in step 516 as a verification, and in step 518, the ADS generates a verification file to be used for billing.

Figure 6:
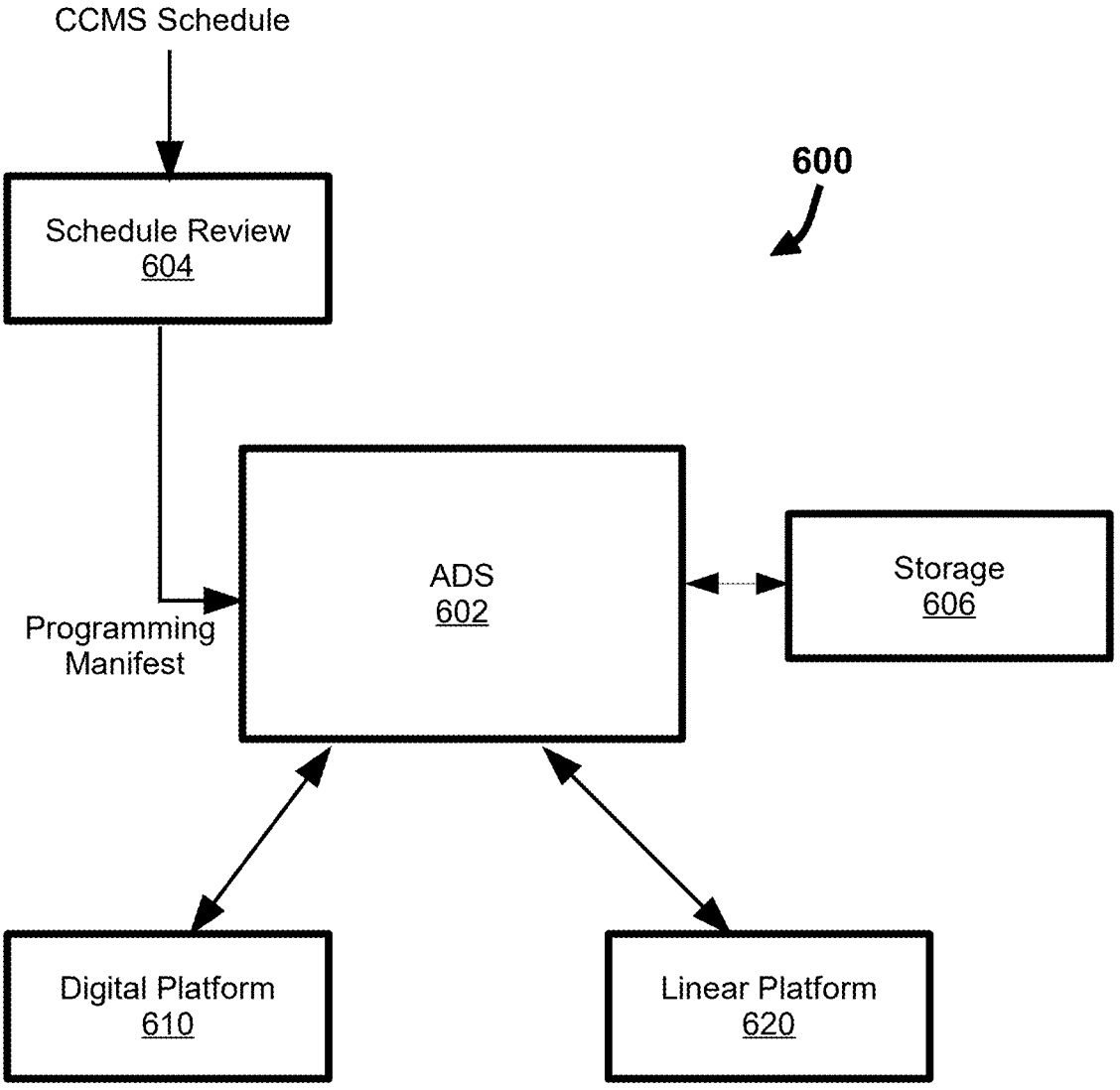
FIG. 6 is a block diagram illustrating a parity ad decision system.

FIG. 6 is a simplified schematic illustration of a system 600 for ad fulfillment by a parity ADS 602. As noted above, linear programming schedules are typically available from linear content providers prior to the scheduled broadcast times and may be imported/downloaded in a known format. The linear programming schedules may be reviewed and analyzed in module 602 and information extracted from the schedules to generate a modified schedule or programming manifest that, in relevant part for this description, identifies ad breaks in the schedules, including scheduled ad breaks (e.g., national ad content) and available ad breaks (e.g., for regional or local ad content). The programming manifest may be generated by a local or regional content distributor or by a third-party vendor—and it is imported/downloaded into the ADS 600. The programming manifest allows ADS 600 to build out responsive ads for every available ad break ahead of time, which it does as described above. The ADS

600 then caches the built-out ads in storage 604 until called for by a digital platform, such as platform 610, in an ad request. In a parallel operation, not described here, ADS 600 sends the same ads to linear platform 620 for playout.

Figure 7:
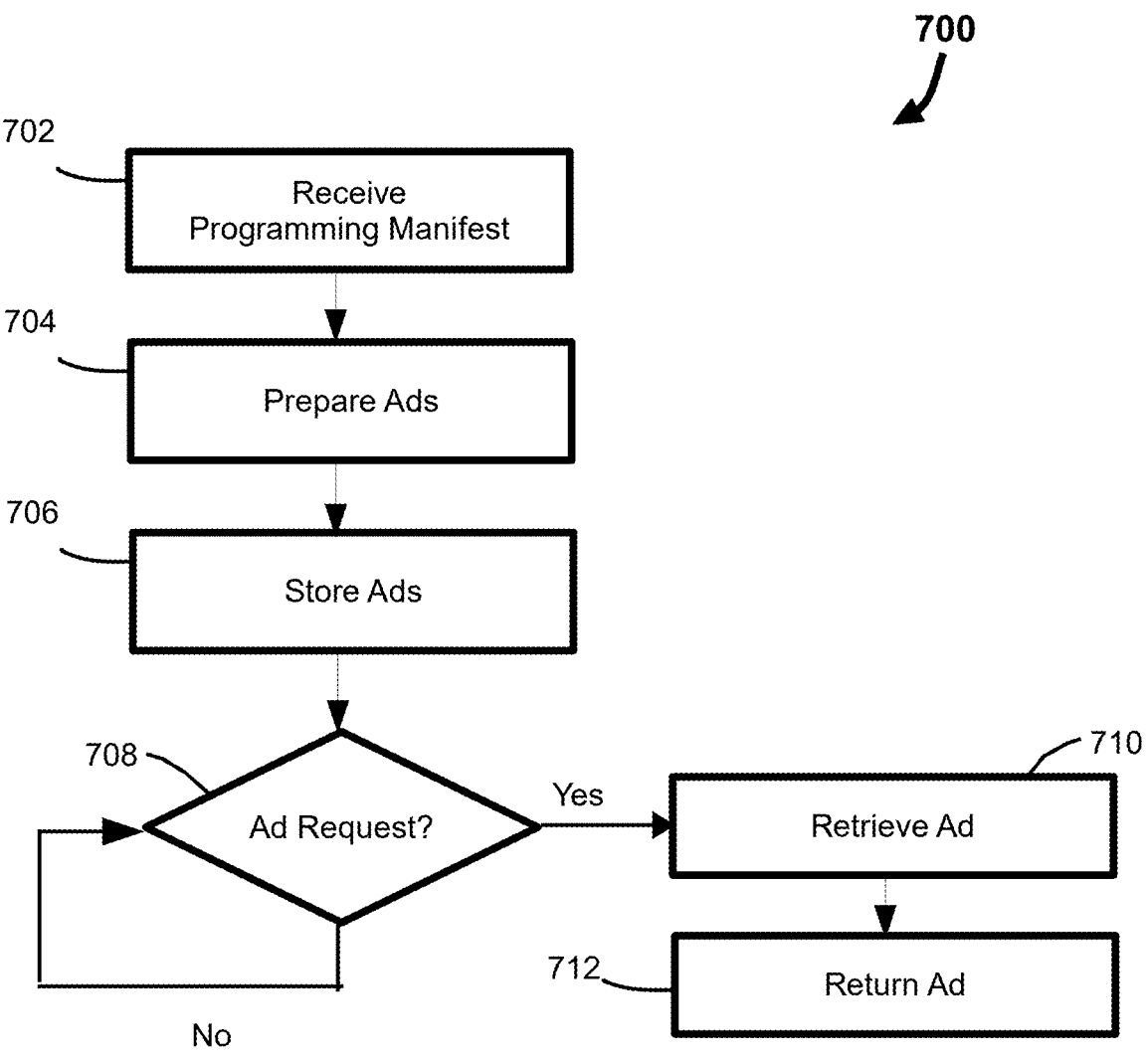
FIG. 7 is a flowchart illustrating a method of implementing a parity ad decisioning system.

FIG. 7 is a flow chart describing the basic method 700 of the parity ADS 600. In step 702, the ADS receives a programming manifest for multiple linear programming sources. The programming manifest identifies ad breaks, including scheduled ad breaks and available ad breaks ("avails") in each linear program on the manifest. Typically, as described above, the scheduled ad breaks are national ad placements, while a few ad breaks are left available for ad insertion by regional or local content distributors. Thus, for each and every linear program on the programming manifest, there are available ad breaks to be filled by a regional or local content distributor.

In step 704, based on the information in the programming manifest, the ADS prepares a VAST-compliant ad corresponding to each available ad break in the schedule. As described above, the schedule will often also include other useful program, marketing and/or targeting information for use in selecting ads. Alternatively, or in addition, the ADS may obtain marketing and/or targeting information from other third-party sources. In step 706, the ads are stored for later play out when requested.

Upon receiving an ad request from a digital platform that is playing out a digital version of a linear program on the schedule in step 708, the ADS will retrieve in step 710 the appropriate VAST-compliant ad corresponding to the available ad break (identified in the ad request), prepared in advance, and return it to the digital platform for playout in step 712. Thus, the same ad will play out in the same time-based location whether the program content is played out on a linear platform as scheduled, or on a digital platform on-demand by the customer.

A parity ADS scheme as described can be useful in any streaming media distribution platform that has disparate feeds and wants consistent advertising messages being fed to their multiple feeds in real time or near real time. While the parity scheme has been described primarily in terms of VAST ad calls and VAST-compliant ad responses, it should be recognized that there are other known methods for making ad calls and formatting ad responses for various digital platforms; for example, VMAP ad calls and VPAID ad responses. Further, the tags embedded in the streaming content that trigger an upcoming ad break can be implemented in a number of different ways within the streaming data structure, for example as an NXDN (Next Generation Digital Narrowband) tone.

Finally, while the parity scheme described herein is schedule-based, it should be obvious that the criteria for preparing ads ahead of time could be time-based preferences of the advertisers rather than schedule-based. For example, the advertiser wants to run ads during one of more selected time periods during the day, such as prime time spots in the evenings, rather than being anchored to a specific program in the schedule.

The foregoing description has been presented for the purpose of illustration only—it is not intended to be exhaustive or to limit the disclosure to the precise form described. Many modifications and variations are possible in light of the above teachings.

The invention claimed is:

1. A method for fulfilling ad requests for insertion into streaming media, comprising:
   detecting that a current local schedule file has been received in an external shared file, the local schedule file including programming information and related marketing information and identifying a plurality of avails for local ad insertion;
   downloading and storing the current local schedule file;
   generating and storing a plurality of ad responses, each one of the plurality of ad responses mapped to one of the plurality of identified avails in the local schedule file;
   receiving an ad request for a first avail from an external manifest server on a digital platform; and
   retrieving one of the plurality of ad responses that is mapped to the respective avail and sending the retrieved and mapped ad response to the external manifest server in response to the ad request.

2. The method of claim 1, further comprising:
   including a tracking beacon with each of the plurality of ads when generated, the tracking beacon will verify ad impressions.

3. The method of claim 2, further comprising:
   receiving the tracking beacon back from the digital platform after an ad impression; and
   generating a verification file for reporting and billing for each ad impression.

4. A system for fulfilling ad requests for insertion into streaming media, comprising:
   a processor configured to perform the steps of:
   (a) detecting receipt of a local broadcast schedule into an external shared file, the local broadcast schedule including a scheduled broadcast of a first linear program, the local broadcast schedule further identifies a plurality of available ad breaks in the first linear program for local ad insertion and includes programming information and related marketing information;
   (b) downloading and storing the local schedule file;
   (c) preparing a plurality of ads in a digital-compatible format for the plurality of available ad breaks, each one of the plurality of ads mapped to a respective one of the plurality of available ad breaks;
   (d) storing the plurality of ads;
   (e) upon receiving a first ad request from an external manifest server that is streaming the first linear program to a digital customer device, the first ad request identifying a first ad break of the plurality of ad breaks, retrieving a first ad from the stored plurality of ads that is mapped to the first ad break; and
   (f) returning the first ad to the external manifest server for playout on the customer device in the first ad break.

5. The system of claim 4, wherein the processor is further configured to incorporate a tracking beacon with each of the plurality of ads when generated, the tracking beacon will verify ad impressions.

6. The system of claim 5, wherein the processor is further configured to receive the tracking beacon back from the digital platform after an ad impression; and to generate a verification file for reporting and billing for each ad impression.

* * * * *